(12) United States Patent
Sakai et al.

(10) Patent No.: US 6,836,715 B2
(45) Date of Patent: Dec. 28, 2004

(54) VEHICLE SEAT

(75) Inventors: Morio Sakai, Toyota (JP); Kazunori Sakamoto, Chiryu (JP); Koji Aoki, Nagoya (JP); Hiromichi Yasunori, Nagoya (JP); Osamu Fujimoto, Nisshin (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 136 days.

(21) Appl. No.: 10/012,301

(22) Filed: Dec. 12, 2001

(65) Prior Publication Data

US 2002/0070853 A1 Jun. 13, 2002

(30) Foreign Application Priority Data

Dec. 12, 2000 (JP) ........................................ 2000-377607

(51) Int. Cl.[7] .............................................. B60R 21/32
(52) U.S. Cl. .................... 701/45; 280/733; 280/735; 280/802; 180/273
(58) Field of Search ............................ 701/45, 46, 47; 180/271, 273; 280/733, 735, 801.1, 802–808; 307/10.1

(56) References Cited

U.S. PATENT DOCUMENTS

| | | | | | |
|---|---|---|---|---|---|
| 5,482,314 | A | * | 1/1996 | Corrado et al. | 280/735 |
| 5,636,864 | A | * | 6/1997 | Hori | 280/735 |
| 5,790,031 | A | * | 8/1998 | Shelton et al. | 340/572.4 |
| 5,848,661 | A | * | 12/1998 | Fu | 180/273 |
| 5,890,085 | A | * | 3/1999 | Corrado et al. | 701/47 |
| 6,243,634 | B1 | * | 6/2001 | Oestreicher et al. | 701/45 |
| 6,264,236 | B1 | | 7/2001 | Aoki | |
| 6,382,667 | B1 | * | 5/2002 | Aoki | 280/735 |
| 6,467,804 | B2 | * | 10/2002 | Sakai et al. | 280/735 |
| 6,490,515 | B1 | * | 12/2002 | Okamura et al. | 701/49 |
| 6,556,137 | B1 | * | 4/2003 | Oka et al. | 340/561 |
| 6,594,571 | B2 | * | 7/2003 | Sakai et al. | 701/45 |
| 2003/0105570 | A1 | * | 6/2003 | Basir et al. | 701/45 |

FOREIGN PATENT DOCUMENTS

| | | |
|---|---|---|
| JP | 10-194077 A | 7/1998 |
| JP | 11-1153 A | 1/1999 |
| JP | 11-304579 A | 11/1999 |
| JP | 2000-127890 A | 5/2000 |

* cited by examiner

*Primary Examiner*—Gary Chin
(74) *Attorney, Agent, or Firm*—Burns, Doane, Swecker & Mathis, L.L.P.

(57) ABSTRACT

A vehicle seat having a load sensor arranged on a seat body for generating a load signal corresponding to a load applied to the seat body, a detecting means for detecting whether a seat belt is buckled to the vehicle seat and generating a detection signal, and a determining means for comparing the load signal and a predetermined value in response to the detection signal when the seat belt is buckled and judging that an adult is not seated on the seat body when the load signal is less than the predetermined value. The seated condition of the vehicle seat is detected properly by the determination result of the determining means.

15 Claims, 6 Drawing Sheets

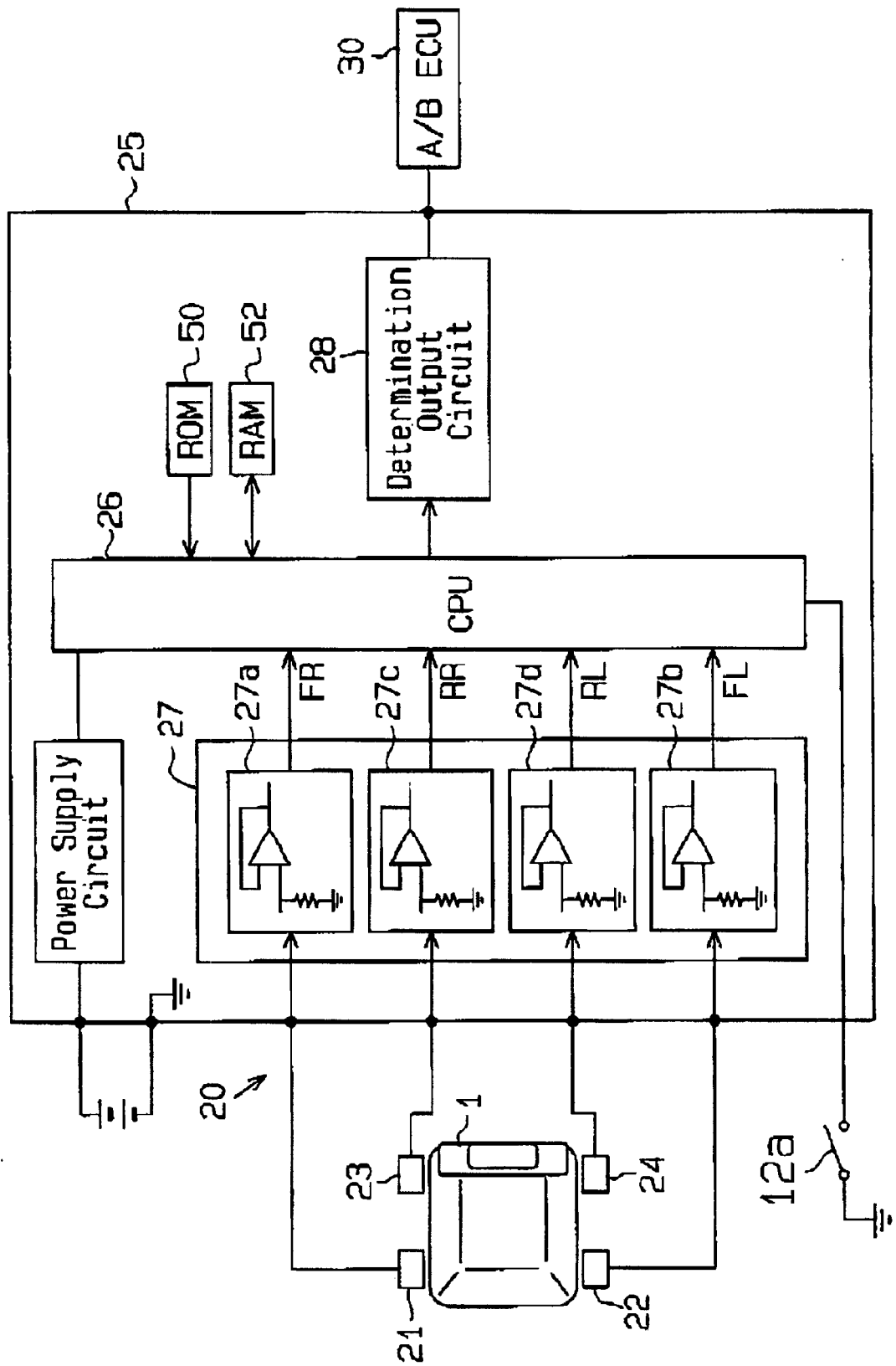

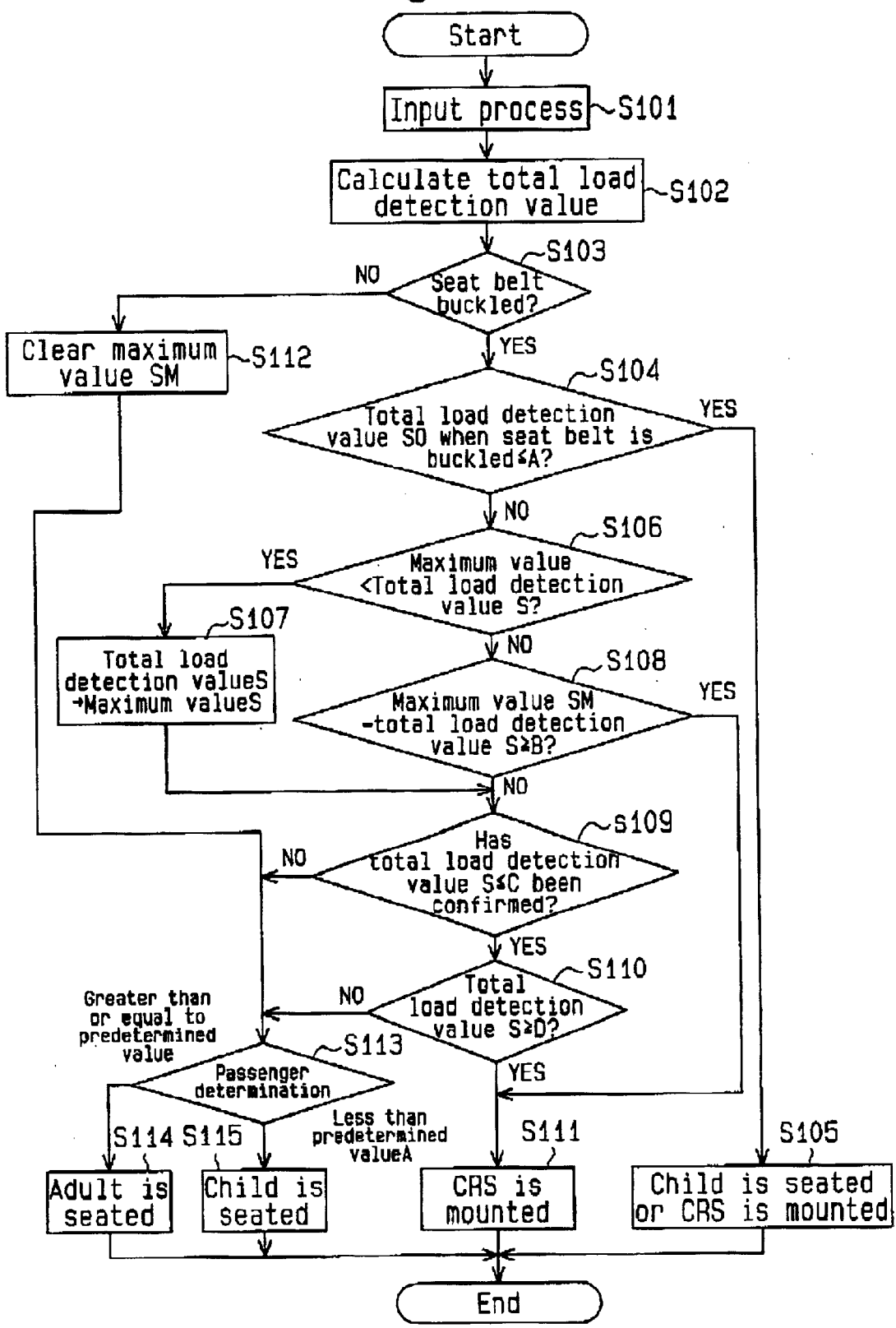

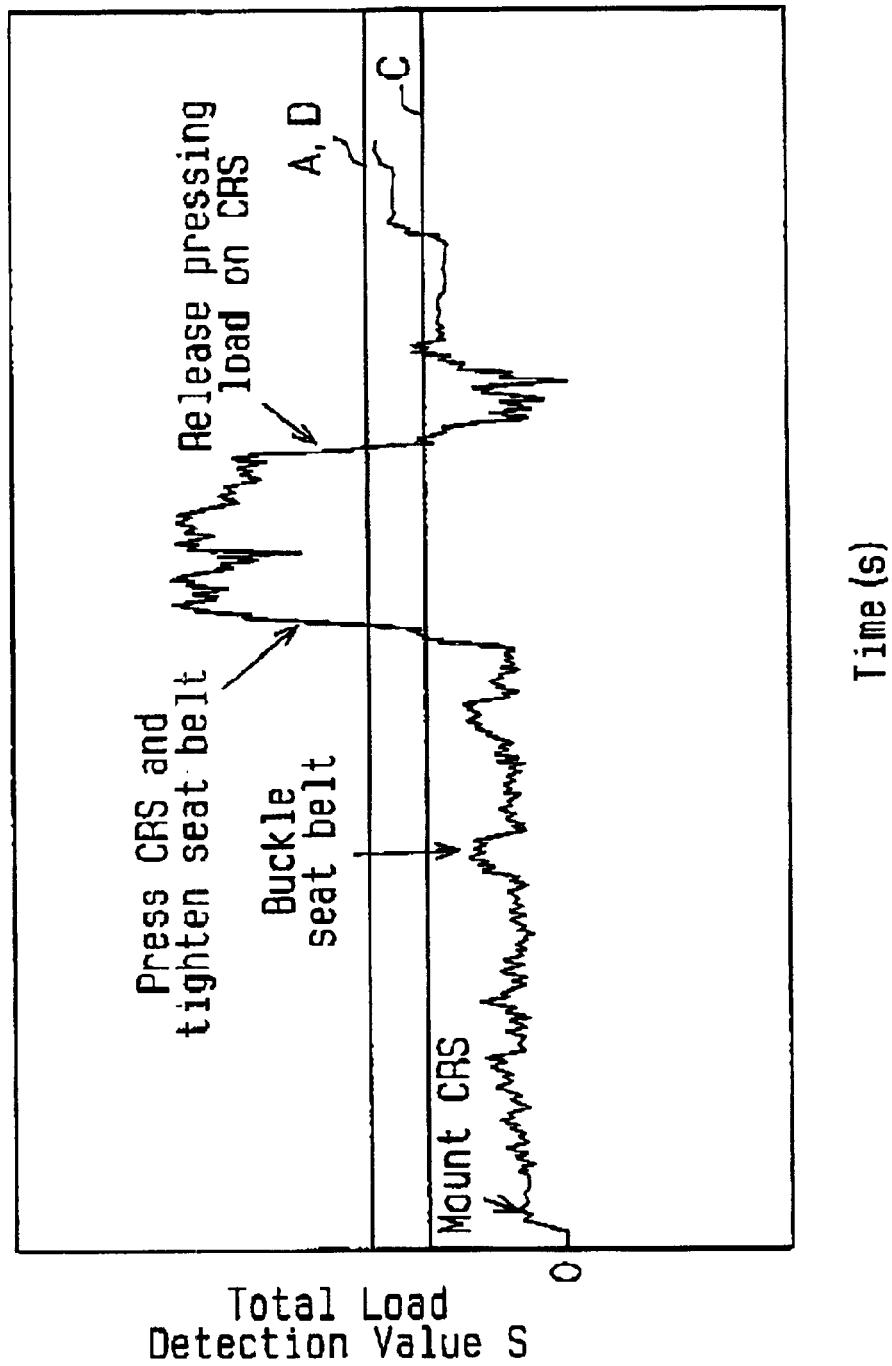

VEHICLE SEAT

BACKGROUND OF THE INVENTION

The present invention is related to a vehicle seat, and more particularly, to a vehicle seat that determines a seated condition based on a load detection signal from a load sensor of a seat body.

In the prior art, for example, a load detector is provided in a vehicle equipped with an air bag, which protects the person sitting on the vehicle seat. The detector is used to detect whether the seat is occupied by a passenger or to adjust the amount of gas generated to inflate the air bag so that the air bag is optimally inflated in accordance with the weight of the seated passenger.

For example, Japanese Unexamined Patent Publication No. 11-1153 discloses a load sensor arranged between two rails and two mount brackets that fix the two rails to the vehicle floor. The two rails are arranged on the left and right sides of the seat and guide the seat slidably. The weight of the seat is detected by a signal from the load sensors.

An adult or a child may be seated in a passenger seat. Further, a child restraint system (CRS) may be secured to the passenger seat. Therefore, it is desirable that the seated condition of the vehicle seat is detected properly so that the air bag may be inflated optimally.

BRIEF SUMMARY OF THE INVENTION

It is an object of the present invention to provide a vehicle seat that properly detects a seated condition of the vehicle seat.

To achieve the above object, the present invention provides a vehicle seat including a seat body, at least one load sensor arranged on the seat body for generating a load signal corresponding to a load applied to the seat body, a detecting means for detecting whether a seat belt is buckled to the vehicle seat and generating a detection signal, and a determining means for comparing the load signal and a predetermined value in response to the detection signal when the seat belt is buckled and determining that an adult is not seated on the seat body when the load signal is less than the predetermined value.

A further perspective of the present invention is a vehicle seat including a seat body, at least one load sensor arranged on the seat body for generating a load signal corresponding to a load applied to the seat body, a detecting means for detecting whether a seat belt is buckled to the vehicle seat and generating a detection signal, and a determining means for checking for a change in the load signal in response to the detection signal after the seat belt is buckled and determining that a child restraint system is mounted on the seat body when detecting an increase in the value of the load signal.

A further perspective of the present invention is a vehicle seat including a seat body, at least one load sensor arranged on the seat body for generating a load signal corresponding to a load applied to the seat body, a detecting means for detecting whether a seat belt is buckled to the vehicle seat and generating a detection signal, and a determining means for checking for a change in the load signal in response to the detection signal after the seat belt is buckled and determining that a child restraint system is mounted on the seat body when detecting a decrease in the value of the load signal.

A further perspective of the present invention is a load detector used for a vehicle seat including a seat body, at least one load sensor arranged on the seat body for generating a load signal corresponding to a load applied to the seat body, and a detecting means for detecting whether a seat belt is buckled to the vehicle seat and generating a detection signal. The detector includes a determining means for comparing the load signal and a predetermined value in response to the detection signal when the seat belt is buckled and determining that an adult is not seated on the seat body when the load signal is smaller than the predetermined value.

A further perspective of the present invention is a load detector used in a vehicle seat including a seat body, at least one load sensor arranged on the seat body for generating a load signal corresponding to a load applied to the seat body, and a detecting means for detecting whether a seat belt is buckled to the vehicle seat and generating a detection signal. The detector includes a determining means for checking for a change in the load signal in response to the detection signal after the seat belt is buckled and determining that a child restraint system is mounted on the seat body when detecting an increase in the value of the load signal.

A further perspective of the present invention is a load detector used for a vehicle seat including a seat body, at least one load sensor arranged on the seat body for generating a load signal corresponding to a load applied to the seat body, and a detecting means for detecting whether a seat belt is buckled to the vehicle seat and generating a detection signal. The detector includes a determining means for checking for a change in the load signal in response to the detection signal after the seat belt is mounted and determining that a child restraint system is mounted on the seat body when detecting a decrease in the value of the load signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a schematic block diagram of a load detector of the vehicle seat of FIG. 1;

FIG. 5 is a flowchart showing a passenger determination routine performed by the load detector of FIG. 4;

FIG. 6 is a graph showing the behavior of the total load detection value detected by the load sensor of the vehicle seat of FIG. 1.

DETAILED DESCRIPTION OF THE PREFERRED EMBODIMENTS

Figure 1:
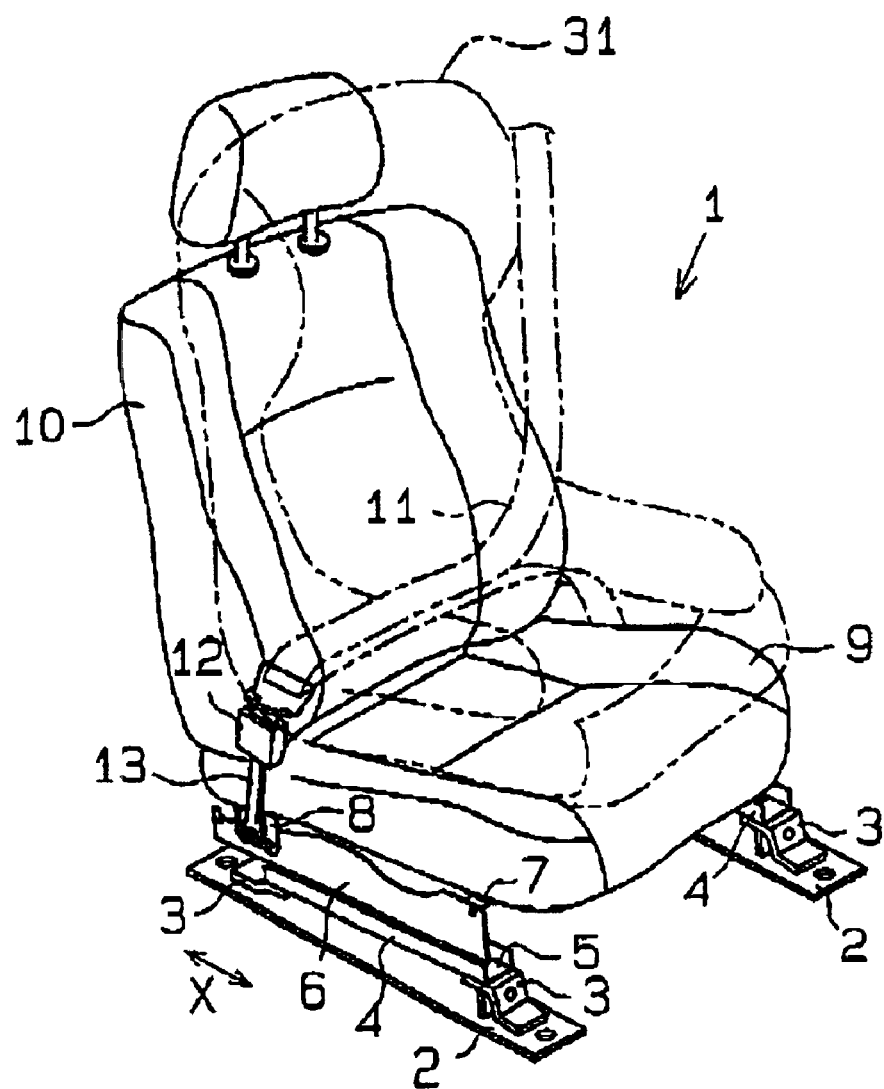
FIG. 1 is a schematic perspective view of a vehicle seat according to a first embodiment of the present invention.

In the drawings, like numerals are used for like elements throughout.

[First Embodiment]

Hereinafter, a vehicle seat according to a first embodiment of the present invention will be discussed with reference to FIGS. 1–6.

As shown in FIG. 1, the vehicle seat is, for example, a passenger's seat and includes a seat body 1, two supporting frames 2, two pairs of brackets 3, two lower rails 4, and two upper rails 6. The two supporting frames 2 are fixed to a vehicle floor (not shown) parallel to each other along a predetermined direction (the direction of arrow X in FIG. 1).

Each of the two pairs of brackets 3 is arranged on the upper surface of a corresponding supporting frame 2. Each of the two lower rails 4 is arranged on corresponding brackets 3 along the corresponding supporting frame 2. Each of the lower rails 4 has a U-shaped cross section in a manner forming an upper opening, which defines a slide groove 5.

Figure 2:
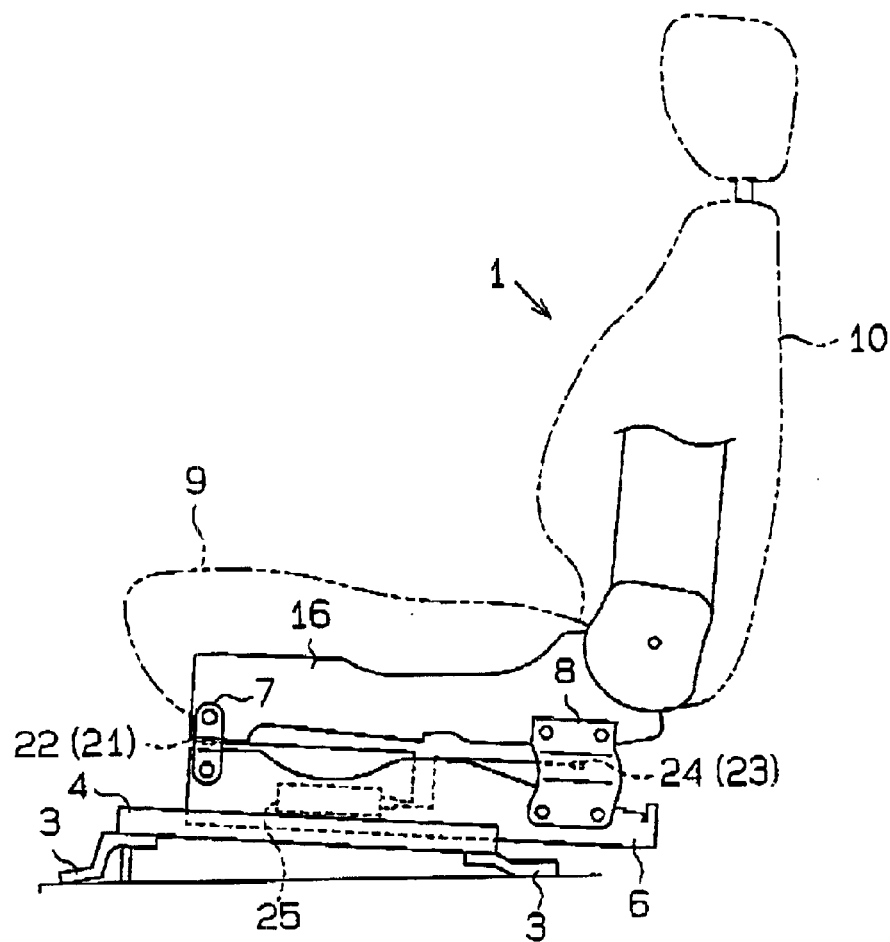
FIG. 2 is a side view of the vehicle seat of FIG. 1.

Each of the two upper rails 6 is slidably held in the slide groove 5 of a corresponding lower rail 4. As shown in FIG. 2, each upper rail 6 is connected to a lower arm 16 by a front sensor bracket 7 and a rear sensor bracket 8. The lower arm 16 supports a seat cushion 9 and a seat back 10 of the seat body 1.

Figure 3A:
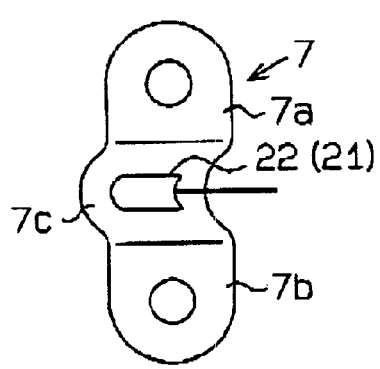
FIGS. 3(a) and 3(b) are front views of a front sensor bracket (3a) and a rear sensor bracket (3b) of the vehicle seat of FIG. 1.

As shown in FIG. 3(a), the front sensor bracket 7 has an upper joint 7a, a lower joint 7b, and a curved flexible portion 7c formed between the upper and lower joints 7a, 7b. The upper joint 7a is connected to the front portion of the associated lower arm 16, and the lower joint 7b is connected to the front portion of the associated upper rail 6. A right front load sensor 21 is attached to the flexible portion 7c of the right front sensor bracket 7, and a left front load sensor 22 is attached to the flexible portion 7c of the left front sensor bracket 7. Each of the front load sensors 21, 22 includes a distortion detector, such as a distortion gauge, and electrically detects the distortion amount of the associated flexible portion 7c in accordance with the load applied to the seat cushion 9 and generates a load signal corresponding to the distortion amount.

Figure 3B:
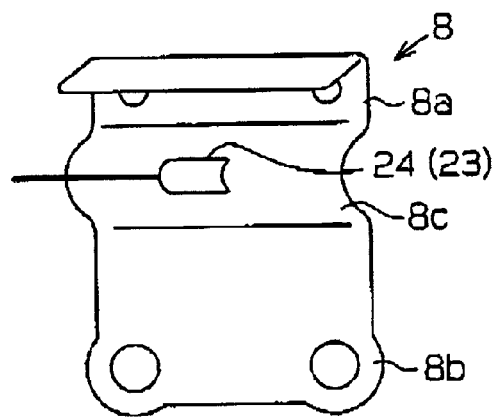

As shown in FIG. 3(b), the rear sensor bracket 8 has an upper joint 8a, a lower joint 8b, and a curved flexible portion 8c formed between the upper and lower joints 8a, 8b. The upper joint 8a is connected to the rear portion of the lower arm 16, and the lower joint 8b is connected to the rear portion of the upper rail 6. A right rear load sensor 23 is attached to the flexible portion 8c of the right rear sensor bracket 8. A left rear load sensor 24 is attached to the flexible portion 8c of the left rear sensor bracket 8. Each of the rear load sensors 23, 24 includes a distortion detector, such as a distortion gauge, and electrically detects the distortion amount of the associated flexible portion 8c in accordance with the load applied to the seat cushion 9 and generates a load signal corresponding to the distortion amount.

An anchor bracket 13 is connected to one of the two upper rails 6 (the left one in FIG. 1), and a belt anchor 12 is connected to the anchor bracket 13. A seat belt 11 is detachably buckled to the belt anchor 12.

FIG. 4 is a schematic block diagram illustrating a load detector 20 of the vehicle seat. The load detector 20 includes the load sensors 21, 22, 23, 24, a seat belt switch 12a, and an electronic control unit (ECU) 25.

The seat belt switch 12a goes on when the seat belt 11 is buckled to the belt anchor 12. The ECU 25 receives a detection signal (a switch on signal or a switch off signal) from the seat belt switch 12a to detect whether the seat belt 11 is buckled or not.

The ECU 25 includes a central processing unit (CPU) 26, a sensor signal input circuit 27, and a determination output circuit 28.

The sensor signal input circuit 27 has active filters 27a, 27b, 27c, 27d that are connected to the right front load sensor 21, the left front load sensor 22, the right rear load sensor 23, and the left rear load sensor 24, respectively. Each of the active filters 27a–27d receives a load signal from the associated load sensor 21–24, filters the load signal, and provides the CPU 26 with a filtered load signal including only low frequency components. Each of the active filters 27a–27d is a known low pass filter formed by combining a passive element, such as a capacitor or a resistance, and an active element, such as an amplifier.

The CPU 26 calculates a load detection value FR of the right front load sensor 21 based on the filtered load signal from the active filter 27a. The CPU 26 also calculates the load detection value FL of the left front load sensor 22 based on the filtered load signal from the active filter 27b. The CPU 26 further calculates the load detection value RR of the right rear load sensor 23 based on the filtered load signal from the active filter 27c and the load detection value RL of the left rear load sensor 24 based on the filtered load signal from the active filter 27d. The CPU 26 adds the load detection values FR, FL, RR, RL to calculate the total load detection value S.

The CPU 26 executes various types of operations using a RAM 52 in accordance with control programs and initial data, which are prestored in a ROM 50, and provides the operation result to the determination output circuit 28. The determination output circuit 28 provides the operation result to an electronic control unit of an air bag device (hereinafter referred to as air bag ECU) 30. The air bag ECU 30 controls the air bag device based on the operation result.

As shown in FIG. 1, a child restraint system (CRS) 31 may be mounted on the seat body 1. The CRS 31 is fastened and fixed to the seat body 1 by the seat belt 11, when mounting the CRS 31 on the seat body 1, the behavior of the total load detection values S was observed by the inventors as shown in FIG. 6. To mount the CRS 31 on the seat body 1, the CRS 31 is first placed on the seat body 1. In this state, the total load detection value S is relatively small because the weight of the CRS 31 is less than the weight of an adult. Next, the seat belt 11 is passed through the CRS 31 and the seat belt 11 is buckled to the belt anchor 12 to loosely fasten the CRS 31. In this state, the seat belt 11 is not tightened. Thus, the total load detection value S is still small. When a small child, whose weight is small, is seated on the seat body 1, the total load detection value S behaves in the same manner.

Next, a person applies his or her weight to the CRS 31 to hold down the CRS 31. In this state, the seat belt 11 is tightened to fix the CRS 31 to the seat body 1. This significantly increases the total load detection value S. After tightening the seat belt 11, the person releases the load from the CRS 31 and completes the CRS mounting procedure. This significantly decreases the total load detection value S.

The mounting of the CRS 31 may be detected by using the above-described behavior of the total load detection value S.

A passenger determination routine using the behavior of the total load detection value S will now be described in accordance with the flowchart of FIG. 5. The passenger determination routine is executed in cyclic interruptions.

First, the CPU 26 executes a signal input process in step S101. More specifically, the CPU 26 receives the load signals from the load sensors 21–24 that are filtered by the sensor signal input circuit 27. Next, in step S102, the CPU 26 calculates the load detection values FR, RR, FL, RL of the load sensors 21–24 from the load signals and the total load detection value S of the load detection value FR, RR, FL, RL. The CPU 26 then temporarily stores the total load detection value S in the RAM 52 and proceeds to step S103.

The CPU 26 determines whether the seat belt 11 is presently buckled in step S103. When the detection signal from the seat belt switch 12a is on, the CPU 26 determines that the seat belt 11 is buckled. When the detection signal is off, the CPU 26 determines that the seat belt 11 is not buckled.

When the CPU 26 determines that the seat belt 11 is buckled, the CPU 26 proceeds to step S104. The CPU 26 determines whether a total load detection value S0, which is detected when the seat belt 11 is buckled, is less than a predetermined value A. The total load detection value S0 detected when the seat belt 11 is buckled is a value taken when the detection signal of the seat belt switch 12a goes on and is stored in the RAM 52. When an adult is seated on the seat body 1, a certain load is applied to the seat body 1 when the buckling of the seat belt 11 is detected. Therefore, the total load detection value S0 is relatively large. On the other hand, when a child is seated on the seat body 1 or when the CRS 31 is loosely fastened to the seat body 1, the total load detection value S0 is small because the load applied by a child or the CRS 31 is small. The first predetermined value A is a reference value for judging whether an adult is seated on the seat body 1 based on the total load detection value S0, which is detected when the seat belt 11 is buckled. (refer to FIG. 6)

In step S104, when it is determined that the total load detection value S0 detected when the seat belt 11 is buckled is less than of equal to the first predetermined value A, the CPU 26 determines that the load applied to the seat body 1 is small and proceeds to step S105 In other words, the CPU 26 determines that a child is seated on the seat body 1 or that the CRS 31 is mounted on the seat body 1. The CPU 26 stores the determination result in the RAM 52 and ends the process.

In step S104, when it is determined that the total load detection value S0 detected when the seat belt 11 is buckled is greater than the first predetermined value A, the CPU 26 proceeds to step S106. In step S106, the CPU 26 determines whether a stored maximum value SM of the total load detection value S is smaller than the current total load detection value S. The maximum value SM is detected after the seat belt 11 is buckled. Namely, the maximum value SM is the maximum value of the total load detection values S calculated after the detection signal from the seat belt switch 12a goes on and is stored in RAM 52. When it is determined that the stored maximum value SM is smaller than the current total load detection value S, the CPU 26 determines that the total load detection value S increases and proceeds to step S107. In step S107, the CPU 26 rewrites the stored maximum value SM to the current total load detection value S and then proceeds to step S109.

In step S106, when it is determined that the stored maximum value SM is greater than or equal to the current total load detection value S, the CPU 26 determines that the total load detection value S decreases and proceeds to step S108. In step S108, the CPU 26 determines whether the difference between the maximum value SM and the current total load detection value S is greater than or equal to a second predetermined value B. The second predetermined value B is a reference value for detecting a decrease in the total load detection value S that occurs when the pressing load on the CRS 31 is released after it is mounted on the seat body 1. When it is detected that the difference between the stored maximum value SM and the current total load detection value S is equal to or greater than the second predetermined value B, the CPU 26 determines that the total load detection value S decreases (in other words, the releasing of the CRS 31 after buckling the seat belt 11 is detected) and proceeds to step S111. In step S111, the CPU 26 determines that the CRS 31 is mounted on the seat body 1, stores the determination result in the RAM 52, and then ends the process.

In step S108, when it is determined that the difference between the stored maximum value SM and the current total load detection value S is less than the second predetermined value B, the CPU 26 proceeds to step S109. In step S109, the CPU 26 determines whether a total load detection value S that is less than or equal to a third predetermined value C has been calculated. Namely, the CPU 26 determines whether a relatively small load, which indicates that the CRS 31 is loosely fastened to the seat body 1, has been detected. The third predetermined value C is a reference value for distinguishing a state in which an adult is seated on the seat body 1 from other states (refer to FIG. 6).

When it is once determined that a total load detection value S is less than or equal to the third value C, the CPU 26 proceeds to step S110 and determines whether the current total load detection value S is greater than or equal to the fourth predetermined value D. The fourth predetermined value D is a reference value for detecting an increase in the total load detection value S that occurs when tightening the loosely fastened seat belt 11 to mount the CRS 31 to the seat body 1 (refer to FIG. 6). The fourth predetermined value D is greater than the third predetermined value C. In step S110, when it is determined that the current total load detection value S is greater than or equal to the fourth predetermined value D, the CPU 26 determines that the total load detection value S increases due to the tightening of the seat belt 11 when securing the CRS 31 and proceeds to step S111. In step S111, the CPU 26 determines that CRS 31 is mounted on the seat body 1 and stores the determination result in the RAM 52 and ends the process.

In step S103, when it is determined that the seat belt 11 is not buckled, the CPU 26 proceeds to step S112. In step S112, the CPU 26 clears the stored maximum value SM of the total load detection values S calculated when the seat belt 11 is buckled and proceeds to step S113.

When a total load detection value S is not less than or equal to the third predetermined value C in step S109 or when it is determined that the current total load detection value S is less than the fourth predetermined value D in step S110, the CPU 26 determines that the total load detection value S does not behave in the same manner as when the CRS 31 is mounted on the seat body 1 and proceeds to step S113.

In step S113, the CPU 26 determines whether a passenger who is seated on the seat body 1 is an adult or a child. For example, when the total load detection value S is greater than or equal to the first predetermined value A, it is determined that the passenger is an adult. When the total load detection value S is smaller than the first predetermined value A, it is determined that the passenger is a child.

When it is determined that the passenger is a child in step S113, the CPU 26 proceeds to step S115 and stores the determination result in RAM 52 and ends the process.

The CPU 26 reads the determination result of step S105, step S111, step S114, or step S115 from the RAM 52 and provides the determination result indicating the seated condition of the seat body 1 to the air bag ECU 30 via the determination output circuit 28. The air bag ECU 30 controls the operation of the air bag device based on the determination result.

The following advantages are obtained in the vehicle seat of the first embodiment.

(1) When the CPU 26 determines that the total load detection value S0 obtained when the seat belt 11 is buckled is less than or equal to the first predetermined value A, a state in which a child is seated on the seat body 1 or the CRS 31 is mounted on the seat body 1 and an adult is not seated on the seat body 1 is detected.

(2) The CPU 26 determines that the CRS 31 is mounted by detecting an increase in the total load detection value S after the seat belt 11 is buckled. That is, when it is determined that a total load detection value S less than or equal to the third predetermined value C has been calculated and that the current total load detection value S is greater than or equal to the fourth predetermined value D, a state in which the CRS 31 has been loosely fastened to the seat body 1 and then securely fastened by tightening the seat belt 11 is detected.

(3) The CPU 26 determines that the CRS 31 is mounted on the seat body 1 by detecting the significant decrease in the total load detection value S after the seat belt 11 is buckled. That is, when the difference between the stored maximum value SM of the total load detection values S and the current total load detection value S is greater than or equal to the second predetermined value B, a state in which the seat belt 11 has been tightened and the CRS 31 has then been released from a pressing force is detected.

[Second Embodiment]

A vehicle seat according to a second embodiment of the present invention will now be discussed referring to FIG. 7. In the second embodiment, a load detector of the vehicle seat accurately detects a fluctuation (a decrease) in the load applied to the seat body 1.

Figure 7:
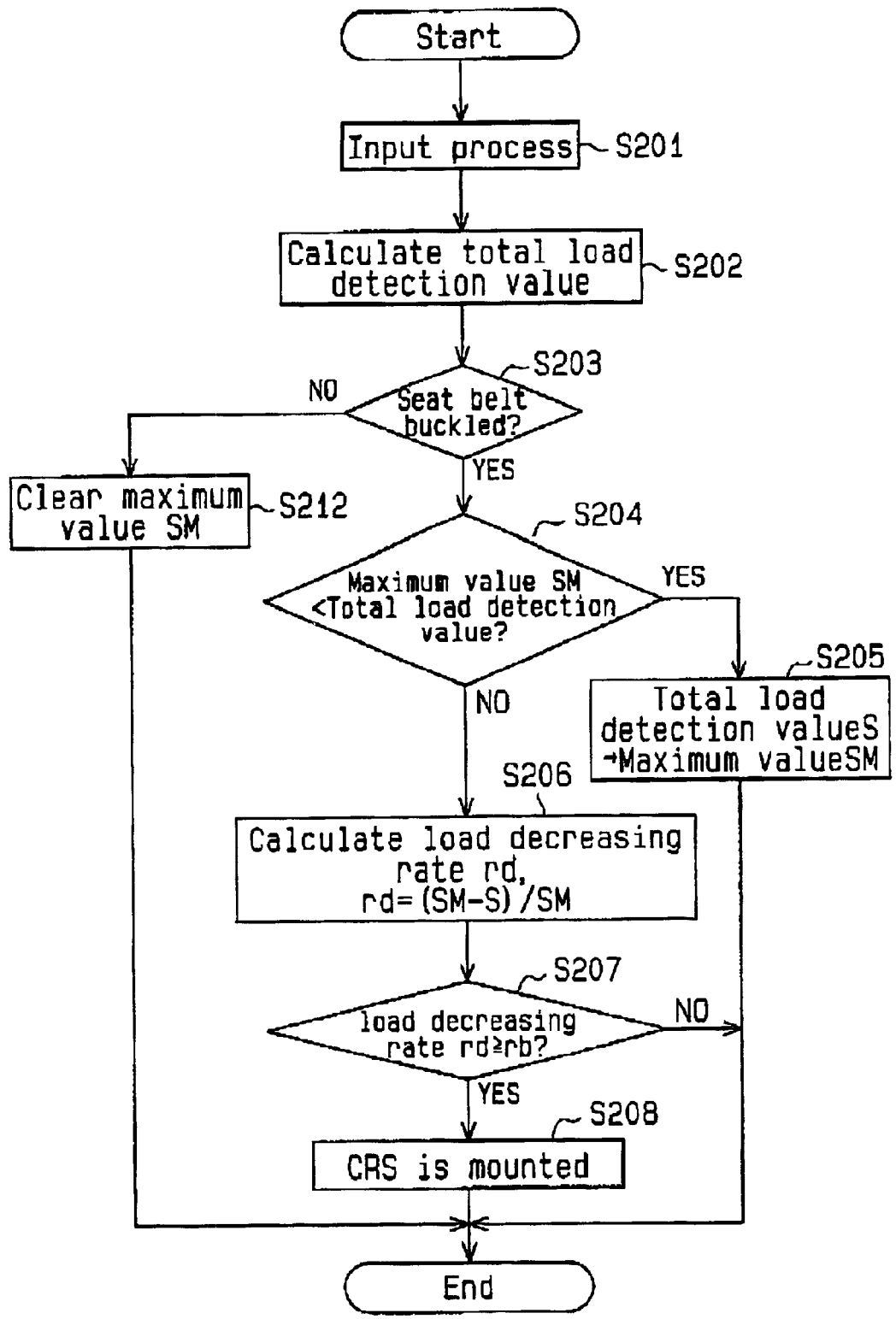
FIG. 7 is a flowchart showing a passenger determination routine performed by a load detector of a vehicle seat according to a second embodiment of the present invention.

As shown in FIG. 7, in the passenger determination routine, the CPU 26 executes an input process (step S201), calculation of the total load detection value S (step S202) and the determination of the buckling of the seat belt 11 (step S203) in the same manner as in the first embodiment.

When it is determined that the seat belt 11 is buckled, the CPU 26 proceeds to step S204. In step S204, the CPU 26 determines whether the stored maximum value SM of the total load detection value S is smaller than the current total load detection value S in the same manner as in step S106. When the stored maximum value SM is smaller than the current total load detection value S, the CPU 26 determines that the total load detection value S increases and proceeds to step S205. In step S205, the CPU 26 rewrites the maximum value SM to the current total load detection value S and ends the process.

In step S204, when it is determined that the stored maximum value SM is greater than or equal to the current total load detection value S the CPU 26 determines that the total load detection value S decreases and proceeds to step S206. In step S206, the CPU 26 divides the difference between the maximum value SM and the current total load detection value S with the stored maximum value SM to calculate a load decreasing rate rd. The CPU 26 uses the load decreasing rate rd as a standardized value for evaluating the fluctuating degree of the load applied to the seat body 1.

The CPU 26 proceeds to step S207 to determine whether the load decreasing rate rd is greater than or equal to a predetermined value rB. The predetermined value rB is set as a reference value for detecting a decrease in the total load detection value S when the CRS 31 is released from a pressing force after the seat belt 11 is tightened. In other words, a fluctuation rate of the total load detection value S is used to detect a decrease in the load applied to the seat body 1 to prevent a load decrease from adversely affecting the detection of the seated state. When it is determined that the load decreasing rate rd is greater than or equal to the predetermined value rB, the CPU 26 determines that a significant decreasing rate of the total load detection value S (i.e., the CRS 31 being released from a pressed state) has been detected and proceeds to step S208. The CPU 26 determines that the CRS 31 is mounted on the seat body 1 in step S208 and stores the determination result in the RAM 52 and ends the process.

When it is determined that the load decreasing rate rd is smaller than the predetermined value rB in S207, the CPU 26 ends the process.

When it is determined that the seat belt 11 is not buckled in step S203, the CPU 26 proceeds to step S212. In step S212, the CPU 26 clears the maximum value SM and ends the process. The CPU 26 provides the determination result of the seated condition of the seat body 1 stored in the RAM 52 to the air bag ECU 30 via the determination output circuit 28. The air bag ECU 30 controls the operation of the air bag device based on the determination result.

The following advantage is obtained in the vehicle seat of the second embodiment.

The CPU 26 determines the seated condition based on the load decreasing rate rd, which is obtained by standardizing fluctuations of the load applied to the seat body 1. This prevents fluctuations in the load applied by a passenger from being erroneously detected as a CRS mounted on the seat body 1. The load may decrease when the passenger seated on the seat moves in the seat. However, in such case, the load decreasing rate is likely to be smaller than the load decreasing rate obtained when mounting the CRS 31. Therefore, by using the predetermined value rB to determine whether a load decrease is caused by the mounting of a CRS, erroneous detection of the CRS resulting from movement of a seated passenger is prevented.

It should be apparent to those skilled in the art that the present invention may be embodied in many other specific forms without departing from the spirit or scope of the invention. Particularly, it should be understood that the invention may be embodied in the following forms.

In the first embodiment, the mounting of the CRS 31 is determined based on the difference between the stored maximum value SM and the total load detection value S. Alternatively, the mounting of the CRS 31 may be determined based on a ratio of the maximum value SM and the total load detection value S.

The detection of the total load detection value S0 when the seat belt 11 is buckled (S104) in the first embodiment and the detection of an increase in the total load detection value S resulting from the fastening of the CRS 31 with the seat belt 11 (S110) in the first embodiment may also be performed in the second embodiment to determine the seated condition.

The number of the load sensors arranged on the seat body 1 is not limited to four and may be changed as required. Further, the arrangement of the sensors may also be changed as required. For example, the seat body 1 may be provided with only one load sensor.

The shapes of the front sensor bracket 7 and the rear sensor bracket 8 may be changed as long as the weight of the seat (load) produces distortion.

In addition to the left seat, the present invention may be applied to the right seat of the vehicle.

The present examples and embodiments are to be considered as illustrative and not restrictive, and the invention is not to be limited to the details given herein, but may be modified within the scope and equivalence of the appended claims.

What is claimed is:

1. A vehicle seat comprising:
   a seat body;
   at least one load sensor arranged on the seat body for generating a load signal corresponding to a load applied to the seat body;
   detecting means for detecting whether a seat belt is buckled and generating a detection signal; and
   determining means for checking for a change in the load signal in response to the detection signal generated after the seat belt is buckled and determining that a child restraint system is mounted on the seat body upon detecting that a value of the load signal is more than a first predetermined value and has increased relative to a stored load signal value, and upon detecting that the value of the load signal is less than a second predetermined value.

2. The vehicle seat according to claim 1, wherein the at least one load sensor is one of four load sensors which each provide an output, and the load signal is a total of the outputs of the four load sensors.

3. The vehicle seat according to claim 1, wherein the second predetermined value is set based on a load applied when tightening the child restraint system by the seat belt.

4. The vehicle seat according to claim 3, wherein the at least one load sensor is one of four load sensors which each provide an output, and the load signal is a total of the outputs of the four load sensors.

5. The vehicle seat according to claim 1, wherein the first predetermined value is greater than a weight of the child restraint system seated on the seat body and less than a weight of an adult seated on the seat body.

6. The vehicle seat according to claim 5, wherein the determining means determines that the child restraint system is mounted on the seat body or that a child is seated on the seat body upon determining that the value of the load signal is less than or equal to the first predetermined value after the seat belt is buckled.

7. The vehicle seat according to claim 5, wherein the at least one load sensor is one of four load sensors which each provide an output, and the load signal is a total of the outputs of the four load sensors.

8. The vehicle seat according to claim 5, wherein the determining means further determines that the child restraint system is mounted on the seat body when a value of the load signal is greater than a third predetermined value which is set based on a load applied when tightening the child restraint system by the seat belt.

9. The vehicle seat according to claim 8, wherein the determining means determines that the child restraint system is mounted on the seat body or that a child is seated on the seat body upon determining that the value of the load signal is less than or equal to the first predetermined value after the seat belt is buckled.

10. The vehicle seat according to claim 9, wherein the at least one load sensor is one of four load sensors which each provide an output, and the load signal is a total of the outputs of the four load sensors.

11. A vehicle seat comprising:
    a seat body;
    at least one load sensor arranged on the seat body for generating a load signal corresponding to a load applied to the seat body;
    detecting means for detecting whether a seat belt is buckled and generating a detection signal; and
    a determining means for checking for a change in the load signal in response to the detection signal after the seat belt is buckled and determining that a child restraint system is mounted on the seat body upon detecting that a value of the load signal has increased relative to a stored load signal value and upon detecting that a decreasing rate in the value of the load signal is greater than a predetermined value.

12. The vehicle seat according to claim 11, wherein the decreasing rate is obtained by dividing a difference value with a maximum value, with the maximum value being the maximum value of the load signal detected during tightening the child restraint system by the seat belt, and the difference value being obtained by subtracting from the maximum value the value of the load signal detected during a decrease in the load signal.

13. The vehicle seat according to claim 11, wherein the predetermined value is set as a reference value for detecting a decrease in the value of the load signal relative to the stored load signal value when the child restraint system is released from a pressing force after the seat belt is tightened.

14. The vehicle seat according to claim 11, wherein the at least one load sensor is one of four load sensors which each provide an output, and the load signal is a total of the outputs of the four load sensors.

15. A load detector used in a vehicle seat comprising a seat body, at least one load sensor arranged on the seat body for generating a load signal corresponding to a load applied to the seat body, and detecting means for detecting whether a seat belt is buckled to the vehicle seat and generating a detection signal, the load detector comprising:
    determining means for checking for a change in the load signal in response to the detection signal generated after the seat belt is buckled and determining that a child restraint system is mounted on the seat body upon detecting that a value of the load signal is more than a first predetermined value and has increased relative to a stored load signal value, and upon detecting that the value of the load signal is less than a second predetermined value.

* * * * *

UNITED STATES PATENT AND TRADEMARK OFFICE
CERTIFICATE OF CORRECTION

PATENT NO. : 6,836,715 B2  
APPLICATION NO. : 10/012301  
DATED : December 28, 2004  
INVENTOR(S) : Morio Sakai et al.

It is certified that error appears in the above-identified patent and that said Letters Patent is hereby corrected as shown below:

Title page, Item 73 (Assignee): add --TOYOTA JIDOSHA KABUSHIKI KAISHA, TOYOTA-SHI, AICHI-KEN, JAPAN--.

Signed and Sealed this

Twelfth Day of May, 2009

JOHN DOLL  
*Acting Director of the United States Patent and Trademark Office*